United States Patent
Lin

(10) Patent No.: US 12,445,898 B2
(45) Date of Patent: Oct. 14, 2025

(54) METHOD OF TRANSMISSION IN SHARED SPECTRUM, USER EQUIPMENT AND STORAGE MEDIUM

(71) Applicant: GUANGDONG OPPO MOBILE TELECOMMUNICATIONS CORP., LTD., Guangdong (CN)

(72) Inventor: Hao Lin, Neuilly sur Seine (FR)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 394 days.

(21) Appl. No.: 18/047,185

(22) Filed: Oct. 17, 2022

(65) Prior Publication Data

US 2023/0080457 A1    Mar. 16, 2023

Related U.S. Application Data

(63) Continuation of application No. PCT/IB2020/000488, filed on Apr. 17, 2020.

(51) Int. Cl.
*H04W 28/02* (2009.01)
*H04W 72/21* (2023.01)
*H04W 72/56* (2023.01)

(52) U.S. Cl.
CPC ....... *H04W 28/0268* (2013.01); *H04W 72/21* (2023.01); *H04W 72/56* (2023.01)

(58) Field of Classification Search
None
See application file for complete search history.

(56) References Cited

U.S. PATENT DOCUMENTS

| | | | |
|---|---|---|---|
| 2019/0313429 A1* | 10/2019 | Cheng | H04W 76/27 |
| 2020/0077430 A1 | 3/2020 | Zhang | |
| 2020/0322971 A1* | 10/2020 | Jung | H04W 72/1268 |
| 2021/0314980 A1* | 10/2021 | Hosseini | H04W 72/21 |

FOREIGN PATENT DOCUMENTS

| | | |
|---|---|---|
| CN | 109155720 A | 1/2019 |
| CN | 110149700 A | 8/2019 |
| CN | 110149705 A | 8/2019 |
| CN | 110383933 A | 10/2019 |
| CN | 110832930 A | 2/2020 |
| WO | 2018075745 A1 | 4/2018 |

(Continued)

OTHER PUBLICATIONS

First Office Action of the Chinese application No. 202310512697.X, issued on Aug. 30, 2024, 14 pages with English translation.

(Continued)

*Primary Examiner* — Christine T Duong
(74) *Attorney, Agent, or Firm* — PERKINS COIE LLP

(57) ABSTRACT

An apparatus and a method of transmission of the same are provided. A method of transmission of a user equipment (UE) includes being configured by a base station to transmit a first transmission on a first set of symbols in time domain, transmitting a second transmission on a second set of symbols in the time domain, and adjusting the first transmission. This can determine prioritization transmissions and can further determine prioritization in a shared spectrum system.

16 Claims, 15 Drawing Sheets

(56) References Cited

FOREIGN PATENT DOCUMENTS

WO 2019140060 A1 7/2019
WO 2019242476 A1 12/2019

OTHER PUBLICATIONS

First Office Action of the European application No. 20751278.1, issued on Dec. 15, 2023. 6 pages.
3GPP TSG RAN WG1 Meeting #99 R1-1912260, Reno, US, Nov. 18-22, 2019, Agenda item: 7.2.2.2.4, Source: Nokia, Nokia Shanghai Bell, Title: On support of UL transmission with configured grants in NR-U, Document for: Discussion and Decision. the whole document. 10 pages.
3GPP TSG RAN WG1 #99 R1-1912512, Reno, USA, Nov. 18-22, 2019, Agenda item: 7.2.6.2, Source: Nokia, Nokia Shanghai Bell, Title: On UCI Enhancements for NR URLLC, Document for: Discussion and Decision. the whole document. 21 pages.
3GPP TSG RAN WG1 #100bis R1-2001615, e-Meeting, Apr. 20-24, 2020, Source: ZTE, Title: Remaining issues on UL inter-UE multiplexing between eMBB and URLLC, Agenda item: 7.2.5.5, Document for: Discussion and Decision. the whole document. 10 pages.
First Office Action of the Japanese application No. 2022-562799, issued on Jan. 5, 2024. 6 pages with English translation.
Office Action of the Indian application No. 202227064348, issued on Jan. 19, 2023. 7 pages with English translation.
3GPP TSG RAN WG1 #100bis-e R1-2002120, e-Meeting, Apr. 20-30, 2020, Agenda item: 7.2.2.2.4, Source: Samsung, Title: Enhancements on configured grant for NR-U, Document for: Discussion and Decision (3 pages).
3GPP TSG RAN WG1 #100bis R1-2001657, e-Meeting, Apr. 20-30, 2020, Source: moderator (vivo), Title: Feature lead summary on NRU configured grant enhancement, Agenda Item: 7.2.2.2.4, Document for: Discussion and Decision (12 pages).
3GPP TS 37.213 V16.1.0 (Mar. 2020), 3rd Generation Partnership Project; Technical Specification Group Radio Access Network; Physical layer procedures for shared spectrum channel access (Release 16) (25 pages).
International Search Report in the international application No. PCT/IB2020/000488, mailed on Dec. 14, 2020 (4 pages).
Written Opinion of the International Search Authority in the international application No. PCT/IB2020/000488, mailed on Dec. 14, 2020 (11 pages).
3GPP TSG RAN WG1 Meeting #100bis-e R1-2001534, E-meeting, Apr. 20-Apr. 30, 2020. Agenda Item: 7.2.2.2.1, Source: Huawei, HiSilicon, Title: Maintenance on the channel access procedure, Document for: Discussion and Decision (16 pages).
3GPP TS 38.213 V16.1.0 (Mar. 2020), 3rd Generation Partnership Project; Technical Specification Group Radio Access Network; NR; Physical layer procedures for control (Release 16) (156 pages).
3GPP TS 38.214 V16.1.0 (Mar. 2020), 3rd Generation Partnership Project; Technical Specification Group Radio Access Network; NR; Physical layer procedures for data (Release 16) (151 pages).
Second Office Action of the European application No. 20751278.1, issued on May 10, 2024, 7 pages.
Result of Consultation of the European application No. 20751278.1, issued on Nov. 20, 2024. 3 pages.
First Office Action of the Korean application No. 10-2022-7040016, issued on May 27, 2025, 11 pages with English translation.

\* cited by examiner

METHOD OF TRANSMISSION IN SHARED SPECTRUM, USER EQUIPMENT AND STORAGE MEDIUM

CROSS-REFERENCE TO RELATED APPLICATION

This is a continuation of International Patent Application No. PCT/IB2020/000488 filed on Apr. 17, 2020, the disclosure of which is hereby incorporated by reference in its entirety.

BACKGROUND OF DISCLOSURE

1. Field of the Disclosure

The present disclosure relates to the field of communication systems, and more particularly, to an apparatus and a method of transmission of the same, which can provide a good communication performance and high reliability.

2. Description of the Related Art

In an unlicensed band, an unlicensed spectrum is a shared spectrum. Communication equipments in different communication systems can use the unlicensed spectrum as long as the unlicensed meets regulatory requirements set by countries or regions on a spectrum. There is no need to apply for a proprietary spectrum authorization from a government.

In order to allow various communication systems that use the unlicensed spectrum for wireless communication to coexist friendly in the spectrum, some countries or regions specify regulatory requirements that must be met to use the unlicensed spectrum. For example, a communication device follows a listen before talk (LBT) procedure, that is, the communication device needs to perform a channel sensing before transmitting a signal on a channel. When an LBT outcome illustrates that the channel is idle, the communication device can perform signal transmission; otherwise, the communication device cannot perform signal transmission. In order to ensure fairness, once a communication device successfully occupies the channel, a transmission duration cannot exceed a maximum channel occupancy time (MCOT).

On an unlicensed carrier, for a channel occupation time obtained by a base station, it may share the channel occupation time to a user equipment (UE) for transmitting an uplink signal or an uplink channel. In other words, when the base station shares its own channel occupancy time with the UE, the UE can use an LBT mode with higher priority than that used by the UE itself to obtain the channel, thereby obtaining the channel with greater probability.

In new radio-based access to unlicensed spectrum (NRU), a wideband operation can be configured and a configured active bandwidth part (BWP) can include resource block sets (RB sets). In addition, in an NRU wideband operation, a BS (such as gNB) and a UE can operate in a wider band including RB sets. NR release 15 has defined a BWP concept, thus in a context of the NRU wideband operation, the UE can be configured with an active BWP including multiple RB sets. Multiple RB sets can be assigned by the gNB to the UE for uplink transmission, e.g. a physical uplink control channel (PUCCH) transmission. However, by regulation, priori to each transmission in the spectrum, a sender needs to perform the LBT procedure. This implies that for transmissions of multiple RB sets, multi-RB set-based LBT has to be performed.

Further, in release 16, if a UE is configured, by a base station, to receive a downlink transmission, the UE does not know if the base station will actually realize the configured downlink transmission and the UE needs to receive the configured downlink transmission, or the base station will cancel the configured downlink transmission, due for example prioritizing the configured resources for other service, thus the UE needs to cancel reception of the configured downlink transmission.

Further, in a release 15, a UE can be configured to perform configured grant transmission. The configured grant transmission is over pre-configured resources without the need to wait for further dynamic uplink grant. However, when the UE is scheduled by a dynamic grant and if the dynamic transmission is scheduled over the configured grant resources, the UE is required to prioritize the dynamic transmission over configured grant transmission. However, how to determine the prioritization in shared spectrum system is still an open issue.

Therefore, there is a need for an apparatus and a method of transmission of the same, which can solve issues in the prior art.

SUMMARY

An object of the present disclosure is to propose an apparatus such as a user equipment (UE) and a method of transmission of the same, which can solve issues in the prior art, can determine prioritization transmissions, and can further determine prioritization in a shared spectrum system.

In a first aspect of the present disclosure, a method of transmission of a user equipment (UE) in shared spectrum includes being configured by a base station to transmit a first transmission on a first set of symbols in a time domain; being configured by the base station to transmit a second transmission on a second set of symbols in the time domain; and adjusting the first transmission.

In a second aspect of the present disclosure, a UE includes a memory, a transceiver, and a processor coupled to the memory and the transceiver. The transceiver is configured by a base station to transmit a first transmission on a first set of symbols in a time domain, the transceiver is configured by the base station to transmit a second transmission on a second set of symbols in the time domain, and the transceiver is configured to adjust the first transmission.

In a third aspect of the present disclosure, a non-transitory computer-readable storage medium has stored thereon instructions that, when executed by a computer, cause the computer to perform the above method.

BRIEF DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION OF EMBODIMENTS

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

Figure 1:
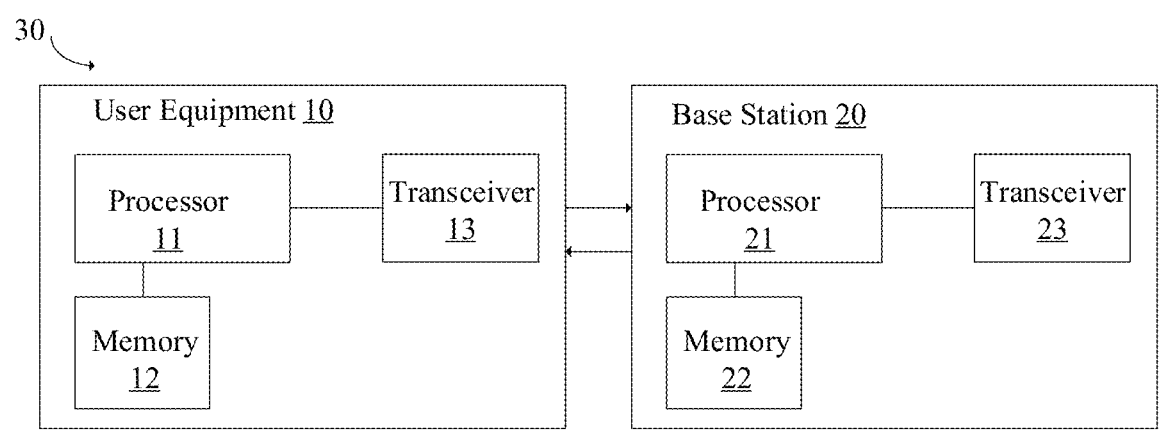
FIG. 1 is a block diagram of a user equipment (UE) and a base station (BS) (e.g., gNB) of communication in a communication network system according to an embodiment of the present disclosure.

FIG. 1 illustrates that, in some embodiments, a user equipment (UE) 10 and a base station (BS) (e.g., gNB) 20 of communication in a communication network system 30 according to an embodiment of the present disclosure are provided. The communication network system 30 includes one or more UEs 10 of a cell and the BS 20. The UE 10 may include a memory 12, a transceiver 13, and a processor 11 coupled to the memory 12, the transceiver 13. The base station 20 may include a memory 22, a transceiver 23, and a processor 21 coupled to the memory 22, the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of first information to operate the processor 11 or 21. The transceiver 13 or 23 is operatively coupled with the processor 11 or 21, and the transceiver 13 or 23 transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

In some embodiments, the transceiver 13 is configured by the base station 20 to transmit a first transmission on a first set of symbols in a time domain, the transceiver 13 is configured by the base station 20 to transmit a second transmission on a second set of symbols in the time domain, and the transceiver 13 is configured to adjust the first transmission. This can solve issues in the prior art, can determine prioritization transmissions, and can further determine prioritization in a shared spectrum system.

In some embodiments, the transceiver 13 can adjust the first transmission. In some embodiments, the second transmission is scheduled by a downlink control information (DCI). In some embodiments, the DCI comprises at least one of the following formats: a format 0_0; a format 0_1; a format 0_2; a format 1_0; a format 1_1; or a format 1_2. In some embodiments, the DCI is detected by the processor 11 in a control resource set (CORESET). In some embodiments, the first set of symbols and the second set of symbols are consecutive in the time domain. In some embodiments, the first set of symbols and the second set of symbols are fully or partially overlapped in the time domain. In some embodiments, the first set of symbols start earlier than the second set of symbols in the time domain. In some embodiments, the first set of symbols start later than a last symbol of the CORESET in the time domain. In some embodiments, at least one symbol of the first set of symbols is within a first time interval. In some embodiments, the first time interval comprises a duration and a starting position. In some embodiments, the starting position comprises the last symbol of the CORESET. In some embodiments, the duration comprises an amount of symbols. In some embodiments, the duration is pre-defined and/or pre-configured. In some embodiments, the duration corresponds to a preparation time for the second transmission. In some embodiments, adjusting the first transmission comprises canceling the first transmission on a subset symbols of the first set of symbols. In some embodiments, determination of the subset symbols corresponds to at least one of the followings: a location of the CORESET; a location of the first set of symbols; or a location of the second set of symbols. In some embodiments, the subset symbols comprise all the first set of symbols except the symbols within the first time interval.

In some embodiments, the subset symbols comprise all the first set of symbols except the symbols within a second time interval. In some embodiments, the second time interval is between the last symbol of the CORESET and a first symbol (such as the earliest symbol) of the second set of symbols. In some embodiments, the transceiver 13 adjusts the first transmission when a first condition is met. In some embodiments, the first condition comprises that the first transmission has same priority or lower priority than the second transmission. In some embodiments, the first transmission has same priority or lower priority than the second transmission comprises at least one of the following: the channel access priority class (p) associated with the first transmission larger than or equal to the channel access priority class (p) associated with the second transmission, where the channel access priority class (p) is given in Table. 1, and it is assumed that the channel access priority class associated with a configured or scheduled transmission is known by the transceiver 13; a priority of channel access type associated with the second transmission is higher or equal to a priority of channel access type associated with the first transmission. In some embodiments, the priority of channel access type comprises at least one of the following: a type 1 channel access has lower priority than a type 2A or type 2B or 2C channel access; a type 2A channel access has lower priority than a type 2B channel access; the type 2B channel access has lower priority than a type 2C channel access; or the type 2A channel access, the type 2B channel access, and the type 2C channel access have the same priority.

In some embodiments, the subset symbols comprise all the first set of symbols except the symbols within a third time interval. In some embodiments, the third time interval is between the last symbol of the CORESET and a reference symbol. In some embodiments, the reference symbol is X symbols earlier than the first symbol of the second set of symbols. In some embodiments, X symbols correspond to a sensing interval for performing a channel access procedure. In some embodiments, the channel access procedure comprises at least one of the followings: a type 1 channel access procedure; a type 2A channel access procedure; a type 2B channel access procedure; or a type 2C channel access procedure, where types 1, 2A, 2B, and 2C are different types of channel access procedures and comprise different channel access sensing intervals. In some embodiments, the channel access procedure is performed for the second transmission. In some embodiments, a value of X corresponds to a symbol duration and/or a channel access sensing interval. In some embodiments, the channel access sensing interval comprises at least one of the followings: a sensing interval for a type 1 channel access (or may be a random interval or non-deterministic interval), and the sensing interval is related to channel access priority class for performing type 1 channel access procedure. The channel access priority class is associated with the second transmission; 25 us; 16 us; or [0, 16) us. In some embodiments, a value of X comprises at least one of the followings: smallest integer such that $0 \leq X*L-25$ us$\leq L$, this means that the X symbols' duration should be smaller than or equal to one symbol duration plus 25 us, and X symbols duration should be greater than or equal to 25 us; or smallest integer such that $0 \leq X*L-16$ us$\leq L$, where L comprises the symbol duration, this means that the X symbols' duration should be smaller than or equal to one symbol duration plus 16 us, and X symbols duration should be greater than or equal to 16 us; "us" means microseconds. The same applies hereinafter. The design principle is to leave enough gap for the UE to perform channel access before the second transmission. If the UE does not cancel the first transmission on the X symbols, the UE cannot perform the channel access procedure. In the end, the UE cannot transmit the second transmission. The value of X is selected to ensure the enough time for channel access, in this case, the X symbols should at least be greater than or equal to the channel access sensing interval. The sensing interval for type 2A channel access is 25 us and for type 2B is 16 us. Thus it is derived that the X symbols duration, i.e. X symbols duration (X*L) should be at least greater than or equal to channel access sensing interval, i.e. 25 us or 16 us depending on channel access types. At the same time, the X symbols should not be too large, which will result in severe cancellation on the first transmission. In our invention, we set that the remaining interval of X symbols after removing the channel access sensing interval should not go beyond one symbol duration, i.e. X symbols duration (X*L) minus the channel access sensing interval is smaller than or equal to one symbol duration (L). This gives a good balance for maintaining maximum the first transmission and ensuring the second transmission. In some embodiments, the transceiver 13 adjusts the first transmission, when a second condition is met. In some embodiments, the second condition comprises that the first condition is not met and/or the channel access type associated with the second transmission is type 2A or type 2B or type 2C.

In some embodiments, adjusting the first transmission comprises completing or not cancelling the first transmission on the first set of symbols. In some embodiments, the transceiver 13 adjusts the first transmission when a third condition is met. In some embodiments, the third condition comprises a fourth time interval is smaller than the channel access sensing interval associated with the second transmission. In some embodiments, the fourth time interval comprises an interval between the end of the first time interval and the start of the second set of symbols.

In some embodiments, the first transmission comprises at least one of the followings: a physical uplink shared channel (PUSCH); a physical uplink control channel (PUCCH); a sounding reference signal (SRS); or a physical random access channel (PRACH). In some embodiments, the second transmission comprises at least one of the followings: a PUSCH; a PUCCH; an SRS; or a PRACH.

Figure 2:
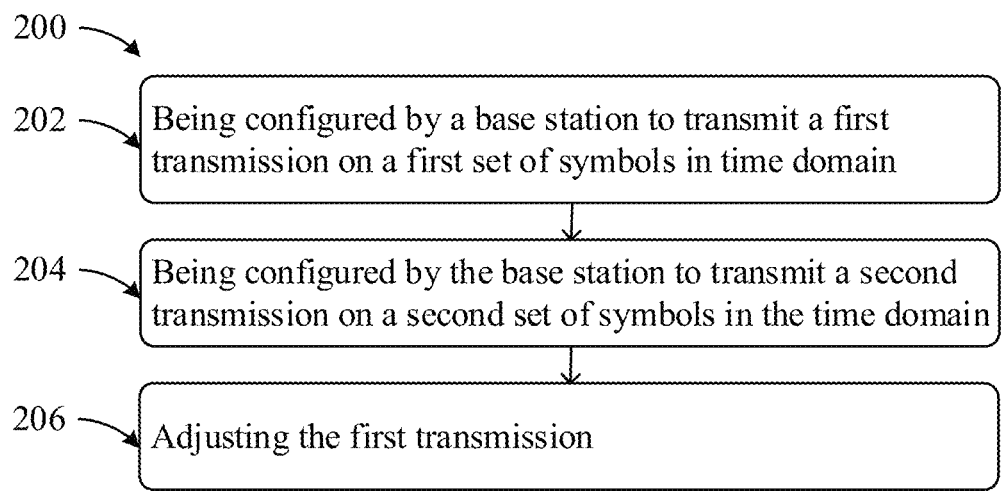
FIG. 2 is a flowchart illustrating a method of transmission of a UE according to an embodiment of the present disclosure.

FIG. 2 illustrates a method 200 of communication of a UE according to an embodiment of the present disclosure. In some embodiments, the method 200 includes: a block 202, being configured by a base station to transmit a first transmission on a first set of symbols in a time domain, a block 204, being configured by the base station to transmit a second transmission on a second set of symbols in the time domain, and a block 206, adjusting the first transmission. This can solve issues in the prior art, can determine prioritization transmissions, and can further determine prioritization in a shared spectrum system.

In some embodiments, the UE can adjust the first transmission. In some embodiments, the second transmission is scheduled by a downlink control information (DCI). In some embodiments, the DCI comprises at least one of the following formats: a format 0_0; a format 0_1; a format 0_2; a format 1_0; a format 1_1; or a format 1_2. In some embodiments, the DCI is detected by the UE in a CORESET. In some embodiments, the first set of symbols and the second set of symbols are consecutive in the time domain. In some embodiments, the first set of symbols and the second set of symbols are fully or partially overlapped in the time domain. In some embodiments, the first set of symbols start earlier than the second set of symbols in the time domain. In some embodiments, the first set of symbols start later than a last symbol of the CORESET in the time domain. In some embodiments, at least one symbol of the first set of symbols is within a first time interval. In some embodiments, the first time interval comprises a duration and a starting position. In some embodiments, the starting position comprises the last symbol of the CORESET. In some embodiments, the duration comprises an amount of symbols. In some embodiments, the duration is pre-defined and/or pre-configured. In some embodiments, the duration corresponds to a preparation time for the second transmission. In some embodiments, adjusting the first transmission comprises canceling the first transmission on a subset symbols of the first set of symbols. In some embodiments, determination of the subset symbols corresponds to at least one of the followings: a location of the CORESET; a location of the first set of symbols; or a location of the second set of symbols. In some embodiments, the subset symbols comprise all the first set of symbols except the symbols within a first time interval.

In some embodiments, the subset symbols comprise all the first set of symbols except the symbols within a second time interval. In some embodiments, the second time interval is between the last symbol of the CORESET and the first symbol (such as the earliest symbol) of the second set of symbols. In some embodiments, the UE adjusts the first transmission when a first condition is met. In some embodiments, the first condition comprises that the first transmission has same priority or lower priority than the second transmission. In some embodiments, the first transmission has same priority or lower priority than the second transmission comprises at least one of the following: the channel access priority class (p) associated with the first transmission larger than or equal to the channel access priority class (p) associated with the second transmission, where the channel access priority class (p) is given in Table. 1, and it is assumed that the channel access priority class associated with a configured or scheduled transmission is known by the UE; a priority of channel access type associated with the second transmission is higher or equal to a priority of channel access type associated with the first transmission. In some embodiments, the priority of channel access type comprises at least one of the following: a type 1 channel access has lower priority than a type 2A or type 2B or 2C channel access; a type 2A channel access has lower priority than a type 2B channel access; the type 2B channel access has lower priority than a type 2C channel access; or the type 2A channel access, the type 2B channel access, and the type 2C channel access have the same priority.

In some embodiments, the subset symbols comprise all the first set of symbols except the symbols within a third time interval. In some embodiments, the third time interval is between the last symbol of the CORESET and a reference symbol. In some embodiments, the reference symbol is X symbols earlier than the first symbol of the second set of symbols. In some embodiments, X symbols correspond to a time interval for performing a channel access procedure. In some embodiments, the channel access procedure comprises at least one of the followings: a type 1 channel access procedure; a type 2A channel access procedure; a type 2B channel access procedure; or a type 2C channel access procedure, where types 1, 2A, 2B, and 2C are different types of channel access procedures and comprise different channel access sensing intervals. In some embodiments, the channel access procedure is performed for the second transmission. In some embodiments, a value of X corresponds to a symbol duration and/or a channel access sensing interval. In some embodiments, the channel access sensing interval comprises at least one of the followings: a sensing interval for a type 1 channel access (or may be a random interval), and the sensing interval is related to channel access priority class for performing type 1 channel access procedure. The channel access priority class is associated with the second transmission; 25 us; 16 us; or [0, 16) us. In some embodiments, a value of X comprises at least one of the followings: smallest integer such that $0 \leq X*L-25$ us$\leq L$, this means that the X symbols' duration should be smaller than or equal to one symbol duration plus 25 us, and X symbols duration should be greater than or equal to 25 us; or smallest integer such that $0 \leq X*L-16$ us$\leq L$, where L comprises the symbol duration, this means that the X symbols' duration should be smaller than or equal to one symbol duration plus 16 us, and X symbols duration should be greater than or equal to 16 us; "us" means microseconds. The same applies hereinafter. The design principle is to leave enough gap for the UE to perform channel access before the second transmission. If the UE does not cancel the first transmission on the X symbols, the UE cannot perform the channel access procedure. In the end, the UE cannot transmit the second transmission. The value of X is selected to ensure the enough time for channel access, in this case, the X symbols should at least be greater than or equal to the channel access sensing interval. The sensing interval for type 2A channel access is 25 us and for type 2B is 16 us. Thus it is derived that the X symbols duration, i.e. X symbols duration (X*L) should be at least greater than or equal to channel access sensing interval, i.e. 25 us or 16 us depending on channel access types. At the same time, the X symbols should not be too large, which will result in severe cancellation on the first transmission. In our invention, we set that the remaining interval of X symbols after removing the channel access sensing interval should not go beyond one symbol duration, i.e. X symbols duration (X*L) minus the channel access sensing interval is smaller than or equal to one symbol duration (L). This gives a good balance for maintaining maximum the first transmission and ensuring the second transmission. In some embodiments, the UE adjusts the first transmission, when a second condition is met. In some embodiments, the second condition comprises that the first condition is not met and/or the channel access type associated with the second transmission is type 2A or type 2B or type 2C.

In some embodiments, adjusting the first transmission comprises completing or not cancelling the first transmission on the first set of symbols. In some embodiments, the UE adjusts the first transmission when a condition is met. In some embodiments, the third condition comprises a fourth time interval is smaller than the channel access sensing interval associated with the second transmission. In some embodiments, the priority class value p corresponds to transmission priority and is known to the UE. In some embodiments, the fourth time interval comprises an interval between the end of the first time interval and the start of the second set of symbols.

In some embodiments, the first transmission comprises at least one of the followings: a physical uplink shared channel (PUSCH); a physical uplink control channel (PUCCH); a sounding reference signal (SRS); or a physical random access channel (PRACH). In some embodiments, the second transmission comprises at least one of the followings: a PUSCH; a PUCCH; an SRS; or a PRACH.

In some embodiment, for a UE, if a first set of symbols are configured to transmit a first transmission, where the first transmission comprises at least one of the followings: PUSCH, PUCCH, SRS, or PRACH, the UE will perform a channel access procedure first in order to access to the channel, on which the first transmission is performed. The channel access procedure includes different types, i.e. type 1, or type 2A, 2B, or 2C. The type 1 channel access has random sensing interval, i.e. the time interval spanned by the sensing slots is random, which corresponds to the channel access priority class (p) of the transmission. In our invention, we assume that the UE knows the channel access priority class (p) for the first transmission if the UE performs channel access procedure type 1 for the first transmission, and the UE knows the channel access priority class (p) for the second transmission if the UE performs channel access procedure type 1 for the second transmission.

In some embodiment, Table 1 for different channel access priority class (p) of transmissions is provided as below.

TABLE 1

| Channel Access Priority Class (p) | $m_p$ | $CW_{min,p}$ | $CW_{max,p}$ | $T_{m\ cot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

The type 2 channel access procedure has a deterministic sensing interval, i.e. the time interval spanned by the sensing slots is deterministic. Moreover, the time interval for type 2A is at least 25 us and for type 2B is 16 us, for type 2C is at most 16 us.

Example

Figure 3:
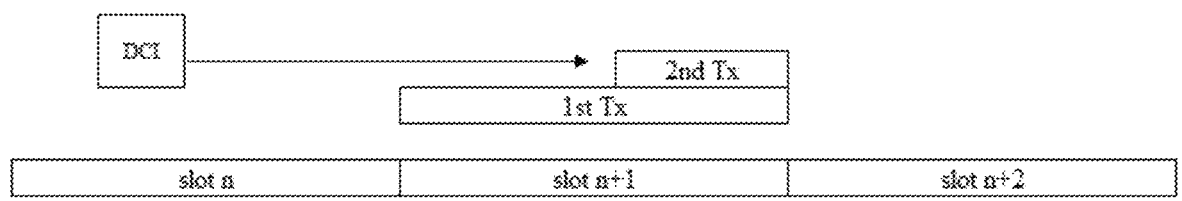
FIG. 3 is a schematic diagram illustrating a resource (such as a first set of symbols) for a first transmission and a resource (such as a second set of symbols) for a second transmission are partially or fully overlapped in time domain according to an embodiment of the present disclosure.
Figure 4:
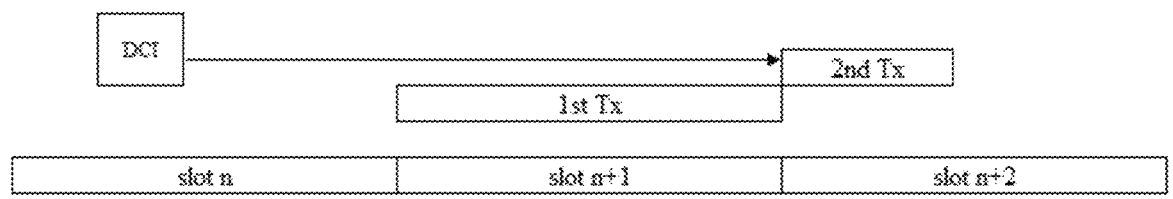
FIG. 4 is a schematic diagram illustrating a resource (such as a first set of symbols) for a first transmission and a resource (such as a second set of symbols) for a second transmission are consecutive in time domain according to an embodiment of the present disclosure.

FIG. 3 illustrates a resource (such as a first set of symbols) for a first transmission and a resource (such as a second set of symbols) for a second transmission are partially or fully overlapped in time domain according to an embodiment of the present disclosure. FIG. 4 illustrates a resource (such as a first set of symbols) for a first transmission and a resource (such as a second set of symbols) for a second transmission are consecutive in time domain according to an embodiment of the present disclosure. FIG. 3 and FIG. 4 illustrate that, in some embodiments, for a UE, if a set of symbols are configured to transmit a first transmission, where the first transmission is at least one of the following: PUSCH, PUCCH, SRS, or PRACH, the UE will perform a channel access procedure first in order to access to the channel, on which the first transmission is performed. When the UE detects a DCI format 1_0 or 1_1 or 0_1 or 0_0 that schedules a second transmission, where the second transmission is at least one of the following: PUSCH, PUCCH, SRS, or PRACH, and a resource for the first transmission and a resource for the second transmission are fully or partially overlapped, e.g. FIG. 3, or consecutive in time domain, e.g. FIG. 4.

Figure 5:
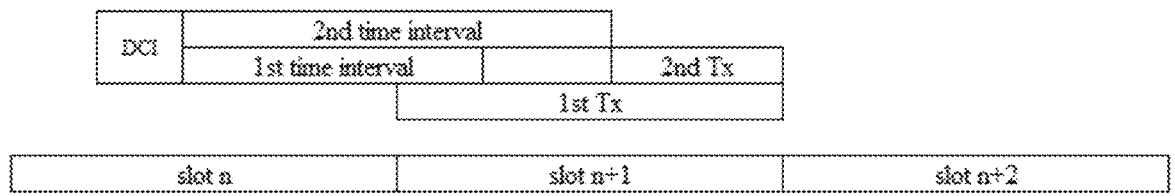
FIG. 5 is a schematic diagram illustrating a resource (such as a first set of symbols) for a first transmission and a resource (such as a second set of symbols) for a second transmission are partially or fully overlapped in time domain according to an embodiment of the present disclosure.
Figure 6:
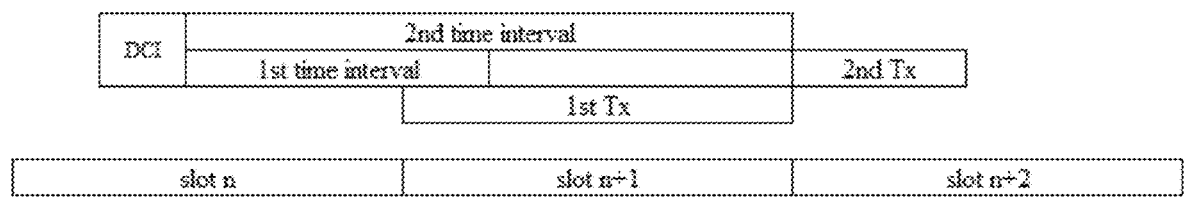
FIG. 6 is a schematic diagram illustrating a resource (such as a first set of symbols) for a first transmission and a resource (such as a second set of symbols) for a second transmission are consecutive in time domain according to an embodiment of the present disclosure.

FIG. 5 illustrates a resource (such as a first set of symbols) for a first transmission and a resource (such as a second set of symbols) for a second transmission are partially or fully overlapped in time domain according to an embodiment of the present disclosure. FIG. 6 illustrates a resource (such as a first set of symbols) for a first transmission and a resource (such as a second set of symbols) for a second transmission are consecutive in time domain according to an embodiment of the present disclosure. FIG. 5 and FIG. 6 illustrate that, in some embodiments, two time intervals are provided, i.e. a first time interval and a second time interval as illustrated in FIG. 5 and FIG. 6, where the second time interval includes the duration between the last symbol of the CORESET in which UE detects the DCI format, and the first symbol of the second transmission. The first time interval is related to the processing time for UE to decode the detected DCI and/or to prepare the second transmission. The first time interval starts from the last symbol of the CORESET in which UE detects the DCI format. The first time interval is pre-defined in the specifications. Optionally, the first time interval is measured by an amount of symbols, where the amount is pre-defined in the specifications or pre-configured by radio resource control (RRC) configuration. In this case, the UE will adjust the first transmission with different behaviors as will be illustrated in following examples.

Figure 7:
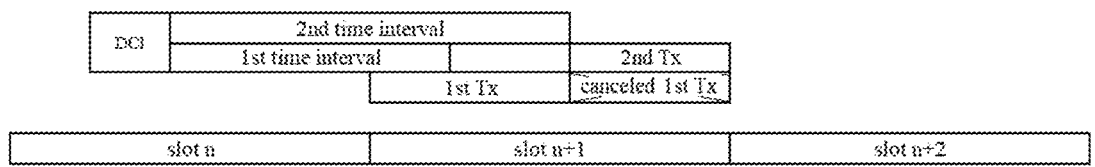
FIG. 7 is a schematic diagram illustrating UE behavior 1 for a case where a resource (such as a first set of symbols) for a first transmission and a resource (such as a second set of symbols) for a second transmission are partially or fully overlapped in time domain according to an embodiment of the present disclosure.
Figure 8:
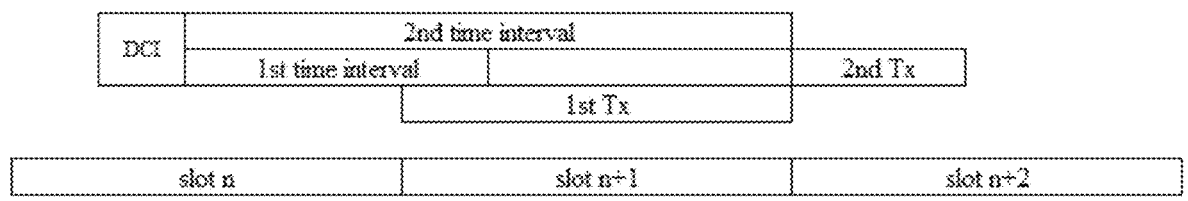
FIG. 8 is a schematic diagram illustrating UE behavior 1 for a case where a resource (such as a first set of symbols) for a first transmission and a resource (such as a second set of symbols) for a second transmission are consecutive in time domain according to an embodiment of the present disclosure.

FIG. 7 and FIG. 8 illustrate a behavior 1 that comprises: the UE does not cancel the first transmission on a subset symbols of the first set of symbols that are within the second time interval, and cancels the first transmission on the remaining symbols that are outside the second time interval. Optionally, the behavior is beneficial for a certain situation, where the UE has already accessed to the channel for transmitting the first transmission during the second time interval, and ideally the UE can continue transmitting the second transmission starting from the first symbol of the second set of symbols. This way, the UE does not need to re-perform the channel access procedure. This solution can reduce the probability of channel access failure for the second transmission. Moreover, a condition allowing that the UE can continue transmitting the second transmission without re-perform channel access procedure is that the first transmission has same priority or lower priority than the second transmission. Optionally, the first transmission has same priority or lower priority than the second transmission comprises at least one of the following: the channel access priority class (p) associated with the first transmission larger than or equal to the channel access priority class (p) associated with the second transmission, where the channel access priority class (p) is given in Table. 1, and it is assumed that the channel access priority class associated with a configured or scheduled transmission is known by the UE; a priority of channel access type associated with the second transmission is higher or equal to a priority of channel access type associated with the first transmission. Optionally, the priority of channel access type comprises at least one of the following: a type 1 channel access has lower priority than a type 2A or type 2B or 2C channel access; a type 2A channel access has lower priority than a type 2B channel access; the type 2B channel access has lower priority than a type 2C channel access; or the type 2A channel access, the type 2B channel access, and the type 2C channel access have the same priority.

Figure 9:
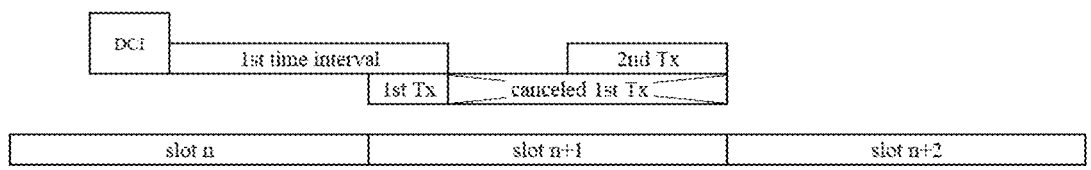
FIG. 9 is a schematic diagram illustrating UE behavior 2 for a case where a resource (such as a first set of symbols) for a first transmission and a resource (such as a second set of symbols) for a second transmission are partially or fully overlapped in time domain according to an embodiment of the present disclosure.
Figure 10:
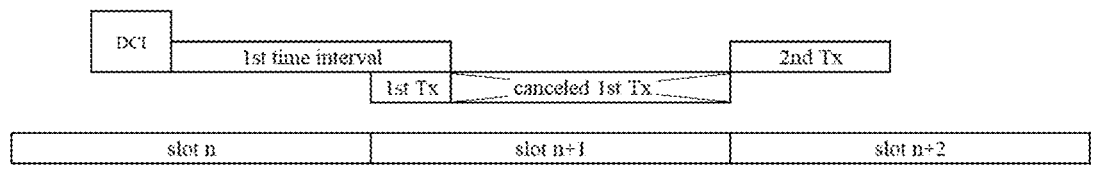
FIG. 10 is a schematic diagram illustrating UE behavior 2 for a case where a resource (such as a first set of symbols) for a first transmission and a resource (such as a second set of symbols) for a second transmission are consecutive in time domain according to an embodiment of the present disclosure.

Alternatively, FIG. 9 and FIG. 10 illustrate a behavior 2 that comprises: the UE does not cancel the first transmission on a subset of symbols of the first set of symbols that are within the first time interval, and cancels the first transmission on the remaining symbols that are outside the first time interval. Optionally, the behavior 2 should be performed by the UE if the UE cannot continue transmitting the second transmission due to the constraint that the UE has to re-perform the channel access procedure for the second transmission. This constraint could be due to for example the priority condition as previously illustrated is not met. In this case the UE will cancel part of the first transmission, leaving sufficient time for the UE to re-perform channel access procedure. The canceled part is determined by the first time interval. The UE will only cancel the first transmission outside the first time interval due to that the UE will need some time to decode the DCI in order to know there is a scheduled second transmission. This processing time is covered by the first time interval.

Figure 11:
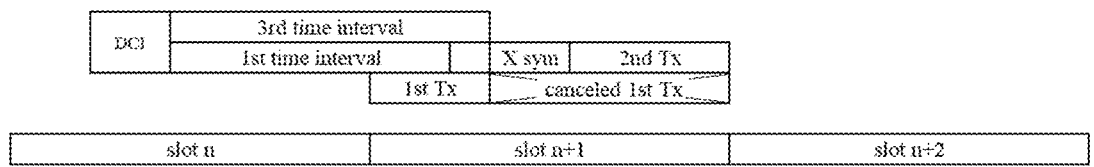
FIG. 11 is a schematic diagram illustrating UE behavior 3 for a case where a resource (such as a first set of symbols) for a first transmission and a resource (such as a second set of symbols) for a second transmission are partially or fully overlapped in time domain according to an embodiment of the present disclosure.
Figure 12:
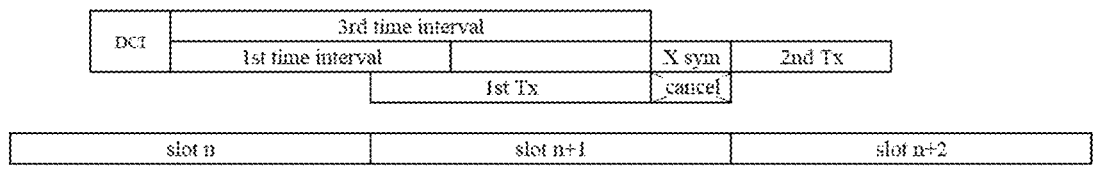
FIG. 12 is a schematic diagram illustrating UE behavior 3 for a case where a resource (such as a first set of symbols) for a first transmission and a resource (such as a second set of symbols) for a second transmission are consecutive in time domain according to an embodiment of the present disclosure.

Alternatively, FIG. 11 and FIG. 12 illustrate a behavior 3 that comprises: the UE will continue transmit the first transmission on a subset of symbols of the first set of symbols that are within a third time interval and cancels the transmission on the remaining symbols that are outside the third time interval, where the third time interval starts from the last symbol of the CORESET where the UE detects the DCI and ends X symbols before the start of the second transmission, as illustrates in FIGS. 11 and 12, where the value of X depends on channel access type 2A or 2B or 2C. Optionally, the UE will perform this behavior 3 when a second condition is met and the second condition is: if the UE will perform type 2 channel access procedure for the second transmission, which includes channel access type 2A, 2B or 2C. In this method, the value of X depends on channel access types, i.e. type 2A, 2B or 2C.

For type 2A, the X the smallest integer such that $0 \leq X*L - 25$ us$\leq L$, where L is an orthogonal frequency division multiplexing (OFDM) symbol duration. The value of L depends on subcarrier spacing. For type 2B, the X the smallest integer such that $0 \leq X*L - 16$ us$\leq L$, where L is the OFDM symbol duration. The value of L depends on subcarrier spacing. For type 2C, the X the smallest integer such that $0 \leq X*L - 16$ us$\leq L$, where L is the OFDM symbol duration. The value of L depends on subcarrier spacing. "us" means microseconds. The same applies hereinafter. The design principle is to leave enough gap for the UE to perform channel access before the second transmission. If the UE does not cancel the first transmission on the X symbols, the UE cannot perform the channel access procedure. In the end, the UE cannot transmit the second transmission. The value of X is selected to ensure the enough time for channel access, in this case, the X symbols should at least be greater than or equal to the channel access sensing interval. The sensing interval for type 2A channel access is 25 us and for type 2B is 16 us. Thus it is derived that the X symbols duration, i.e. X*L should be at least greater than or equal to channel access sensing interval, i.e. 25 us or 16 us depending on channel access types. At the same time, the X symbols should not be too large, which will result in severe cancellation on the first transmission. In our invention, we set that the remaining interval of X symbols after removing the channel access sensing interval should not go beyond one symbol duration, i.e. X*L minus the channel access sensing interval is smaller than or equal to one symbol duration (L). This gives a good balance for maintaining maximum the first transmission and ensuring the second transmission.

Figure 13:
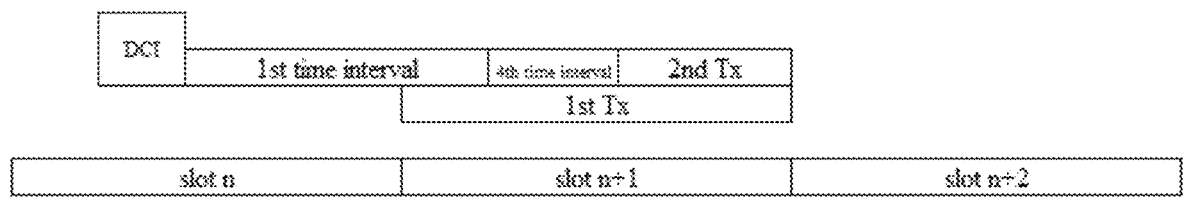
FIG. 13 is a schematic diagram illustrating UE behavior 4 for a case where a resource (such as a first set of symbols) for a first transmission and a resource (such as a second set of symbols) for a second transmission are partially or fully overlapped in time domain according to an embodiment of the present disclosure.
Figure 14:
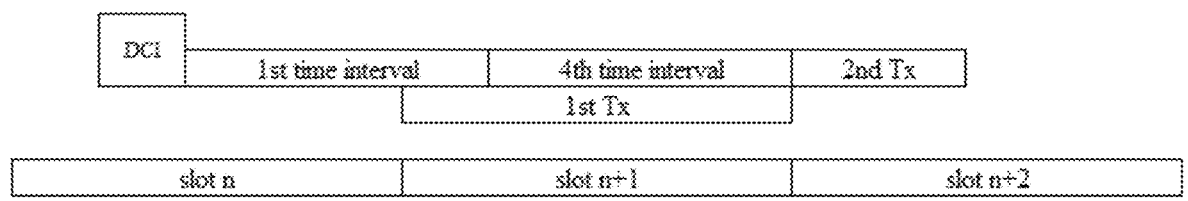
FIG. 14 is a schematic diagram illustrating UE behavior 4 for a case where a resource (such as a first set of symbols) for a first transmission and a resource (such as a second set of symbols) for a second transmission are consecutive in time domain according to an embodiment of the present disclosure.

Alternatively, FIG. 13 and FIG. 14 illustrate a behavior 4 that comprises: UE will complete or not cancel the first transmission on the set of symbols as illustrated in FIG. 13 and FIG. 14. This behavior can ensure a good transmission quality of the first transmission. Optionally, the UE can perform this behavior when a third condition is met where the third condition is that if a fourth time interval is smaller than a sensing interval, where the fourth time interval includes the duration between the end of the first time interval and the start of the second transmission. The sensing interval is the channel access procedure sensing interval, which is randomly determined for type 1 channel access and deterministic for type 2 channel access (including type 2A, 2B, or 2C). The third condition being met means that the UE can complete or not cancel the channel access procedure within the fourth time interval. While if the third condition is not met, it means that the UE cannot complete the channel access procedure within the fourth time interval, thus it also means that the second transmission cannot be transmitted if the channel access procedure is not completed. In this case, it is beneficial for the UE to at least complete the first transmission.

Commercial interests for some embodiments are as follows. 1. solving issues in the prior art. 2. determining prioritization transmissions. 3. determining prioritization in a shared spectrum system. 4. providing a good communication performance. 5. providing a high reliability. 6. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. Some embodiments of the present disclosure are a combination of "techniques/processes" that can be adopted in 3GPP specification to create an end product. Some embodiments of the present disclosure could be adopted in the 5G NR unlicensed band communications. Some embodiments of the present disclosure propose technical mechanisms.

Figure 15:
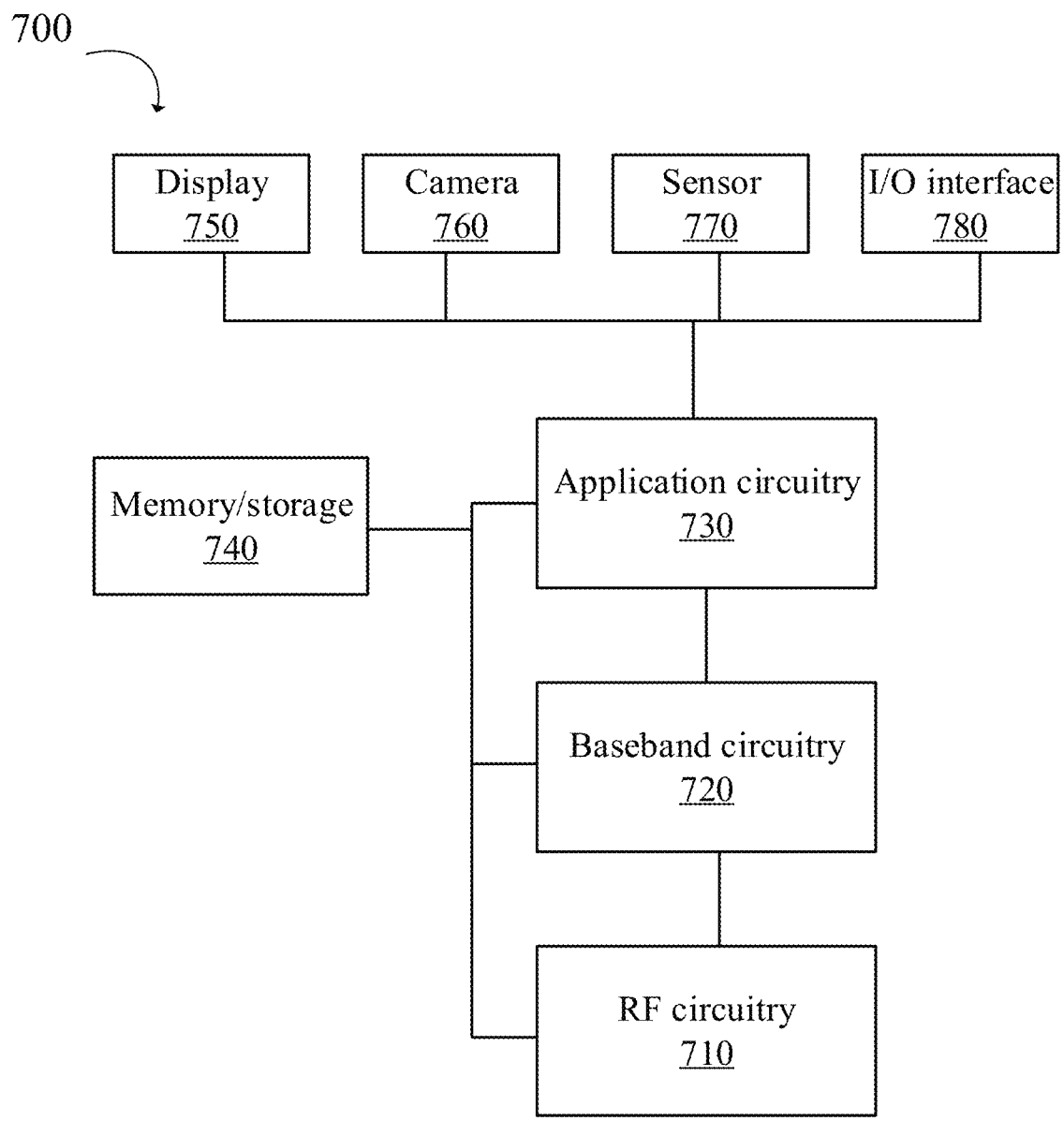
FIG. 15 is a block diagram of a system for wireless communication according to an embodiment of the present disclosure.

FIG. 15 is a block diagram of an example system 700 for wireless communication according to an embodiment of the present disclosure. Embodiments described herein may be implemented into the system using any suitably configured hardware and/or software. FIG. 15 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated. The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency. The RF circuitry 710 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the application circuitry, and/or the memory/storage may be implemented together on a system on a chip (SOC). The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface. In various embodiments, the sensor 770 may include one or more sensing devices to determine environmental states and/or location first information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, a AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the state of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A method of transmission of a user equipment (UE) in shared spectrum, comprising:
    being configured by a base station to transmit a first transmission on a first set of symbols in time domain;
    being scheduled by the base station to transmit a second transmission on a second set of symbols in the time domain, the second set of symbols being consecutive to the first set of symbols in the time domain, the first set of symbols starting earlier than the second set of symbols in the time domain; and
    when a priority of channel access type for the second transmission is lower than a priority of channel access type for the first transmission, adjusting the first transmission by canceling the first transmission on subset symbols of the first set of symbols, wherein at least one symbol of the first set of symbols is within a first time interval, the first time interval comprises a duration and a starting position, the starting position comprises a last symbol of a control resource set (CORESET) in which a downlink control information (DCI) for scheduling the second transmission is detected by the UE, the duration corresponds to a preparation time for the second transmission, and wherein the subset symbols comprise all the first set of symbols except the at least one symbol within the first time interval,
    wherein the first transmission is a sounding reference signal (SRS) transmission using pre-configured grant resources.

2. The method of claim 1, wherein the second transmission comprises an uplink transmission.

3. The method of claim 1, wherein the duration is pre-defined and/or pre-configured.

4. The method of claim 1, wherein the UE adjusts the first transmission when a condition is met.

5. The method of claim 4, wherein the condition comprises at least one of the followings:
    a channel access priority class (p) of the second transmission is smaller or equal to a channel access priority class (p) of the first transmission;
    the priority of channel access type for the second transmission is higher or equal to the priority of channel access type for the first transmission;
    for the second transmission, the UE needs to perform a type 2 channel access procedure; or
    a fourth time interval is smaller than a channel access sensing interval.

6. The method of claim 1, wherein the second transmission comprises at least one of the followings:
    a physical uplink shared channel (PUSCH);
    a physical uplink control channel (PUCCH);
    a sounding reference signal (SRS); or
    a physical random access channel (PRACH).

7. A user equipment (UE), comprising:
    a memory for storing a computer program;
    a transceiver;
    a processor, coupled to the memory and the transceiver and configured to execute the computer program to perform the following operations:
    being configured by a base station to transmit a first transmission on a first set of symbols in time domain via the transceiver;
    being scheduled by the base station to transmit a second transmission on a second set of symbols in the time domain via the transceiver, the second set of symbols being consecutive to the first set of symbols in the time domain, the first set of symbols starting earlier than the second set of symbols in the time domain; and
    when a priority of channel access type for the second transmission is lower than a priority of channel access type for the first transmission, adjusting the first transmission via the transceiver by canceling the first transmission on subset symbols of the first set of symbols, wherein at least one symbol of the first set of symbols is within a first time interval, the first time interval comprises a duration and a starting position, the starting position comprises a last symbol of a control resource set (CORESET) in which a downlink control information (DCI) for scheduling the second transmission is detected by the UE, the duration corresponds to a preparation time for the second transmission, and wherein the subset symbols comprise all the first set of symbols except the at least one symbol within the first time interval,
    wherein the first transmission is a sounding reference signal (SRS) transmission using pre-configured grant resource.

8. The UE of claim 7, wherein the second transmission comprises an uplink transmission.

9. The UE of claim 7, wherein the duration is pre-defined and/or pre-configured.

10. The UE of claim 7, wherein the UE adjusts the first transmission when a condition is met.

11. The UE of claim 10, wherein the condition comprises at least one of the followings:
    a channel access priority class (p) of the second transmission is smaller or equal to a channel access priority class (p) of the first transmission;
    the priority of channel access type for the second transmission is higher or equal to the priority of channel access type for the first transmission;
    for the second transmission, the UE needs to perform a type 2 channel access procedure; or
    a fourth time interval is smaller than a channel access sensing interval.

12. The UE of claim 7, wherein the second transmission comprises at least one of the followings:
   a physical uplink shared channel (PUSCH);
   a physical uplink control channel (PUCCH);
   a sounding reference signal (SRS); or
   a physical random access channel (PRACH).

13. A non-transitory computer readable storage medium having stored thereon instructions that, when executed by a computer, cause the computer to perform the following operations:
   being configured by a base station to transmit a first transmission on a first set of symbols in time domain;
   being scheduled by the base station to transmit a second transmission on a second set of symbols in the time domain, the second set of symbols being consecutive to the first set of symbols in the time domain, the first set of symbols starting earlier than the second set of symbols in the time domain; and
   when a priority of channel access type for the second transmission is lower than a priority of channel access type for the first transmission, adjusting the first transmission by canceling the first transmission on subset symbols of the first set of symbols, wherein at least one symbol of the first set of symbols is within a first time interval, the first time interval comprises a duration and a starting position, the starting position comprises a last symbol of a control resource set (CORESET) in which a downlink control information (DCI) for scheduling the second transmission is detected by the computer, the duration corresponds to a preparation time for the second transmission, and wherein the subset symbols comprise all the first set of symbols except the at least one symbol within the first time interval,
   wherein the first transmission is a sounding reference signal (SRS) transmission using pre-configured grant resources.

14. The method of claim 1, further comprising:
   when the priority of channel access type for the second transmission is higher than or equal to the priority of channel access type for the first transmission, adjusting the first transmission by canceling the first transmission on another subset of the first set of symbols that is outside a second time interval, wherein the second time interval comprises an interval between the last symbol of the CORESET and a first symbol of the second set of symbols.

15. The UE of claim 7, wherein the operations further comprise:
   when the priority of channel access type for the second transmission is higher than or equal to the priority of channel access type for the first transmission, the UE adjusting the first transmission by canceling the first transmission on another subset of the first set of symbols that is outside a second time interval, wherein the second time interval comprises an interval between the last symbol of the CORESET and a first symbol of the second set of symbols.

16. The non-transitory computer readable storage medium of claim 13, wherein the operations further comprise:
   when the priority of channel access type for the second transmission is higher than or equal to the priority of channel access type for the first transmission, adjusting the first transmission by canceling the first transmission on another subset of the first set of symbols that is outside a second time interval, wherein the second time interval comprises an interval between the last symbol of the CORESET and a first symbol of the second set of symbols.

* * * * *